United States Patent [19]

Kerr et al.

[11] Patent Number: 5,744,531

[45] Date of Patent: Apr. 28, 1998

[54] ANIONIC ELECTROCOATING COMPOSITIONS CONTAINING HYDROXYALKYLAMIDE CURING AGENTS

[75] Inventors: Paul R. Kerr, Hampton Township, Allegheny County; Raphael O. Kollah, Shaler Township, Allegheny County; Steven R. Zawacky, Pittsburgh; Patricia A. Aikens, Hockessin Township, New Castle County, all of Pa.

[73] Assignee: PPG Industries, Inc., Pittsburgh, Pa.

[21] Appl. No.: 670,829

[22] Filed: Jun. 24, 1996

[51] Int. Cl.$^6$ ................................................. C08F 8/30
[52] U.S. Cl. ................... 524/432; 524/556; 525/329.9; 525/374
[58] Field of Search ........................... 524/432, 558; 525/374

[56] References Cited

U.S. PATENT DOCUMENTS

| | | | |
|---|---|---|---|
| 3,455,806 | 7/1969 | Spoor et al. | 204/181 |
| 4,076,917 | 2/1978 | Swift et al. | |
| 4,101,606 | 7/1978 | Cenci et al. | |
| 4,115,637 | 9/1978 | Cenci et al. | |
| 4,138,541 | 2/1979 | Cenci et al. | |
| 4,346,144 | 8/1982 | Craven. | |
| 4,423,167 | 12/1983 | Valko | 523/414 |
| 4,423,168 | 12/1983 | Valko | 523/414 |
| 4,423,169 | 12/1983 | Valko | 523/414 |
| 4,440,612 | 4/1984 | Valko | 204/181 |
| 4,489,182 | 12/1984 | Valko | 523/414 |
| 4,511,447 | 4/1985 | Valko | 204/181 C |
| 4,727,111 | 2/1988 | Pettit, Jr. et al. | |
| 4,788,255 | 11/1988 | Pettit, Jr. et al. | 525/131 |
| 4,801,680 | 1/1989 | Geary et al. | |
| 4,889,890 | 12/1989 | Kerr et al. | |
| 4,937,288 | 6/1990 | Pettit, Jr. et al. | 525/176 |
| 4,988,767 | 1/1991 | Pettit, Jr. | 525/194 |
| 5,013,791 | 5/1991 | Kerr et al. | 525/113 |
| 5,098,955 | 3/1992 | Pettit, Jr. | 525/194 |
| 5,132,341 | 7/1992 | Paar | 523/404 |
| 5,182,337 | 1/1993 | Pettit, Jr. et al. | 525/176 |
| 5,202,383 | 4/1993 | Moriarity et al. | 525/124 |
| 5,214,101 | 5/1993 | Pettit, Jr. et al. | 525/176 |
| 5,216,090 | 6/1993 | Merritt et al. | 525/437 |
| 5,266,628 | 11/1993 | Essary et al. | 524/556 |
| 5,464,887 | 11/1995 | Scott et al. | 523/501 |

FOREIGN PATENT DOCUMENTS

WO 94/03545  2/1994  WIPO.

OTHER PUBLICATIONS

"β-Hydroxyalkylamides, Low Polluting Crosslinkers For Carboxyl Containing Polymers", Journal of Coatings Technology, James Lomax and Graham Swift, Rohm & Haas Company, vol. 50, No. 643, Aug. 1978, pp. 49–55.

Journal of Coatings Technology, pp. 51–61, Wicks, Jr., et al, Reaction of N-(2-Hydroxyethyl) Amido Compounds, vol. 57, No. 726, Jul. 1985.

Resin Review, vol. XLI, No. 2, ed. Thomas H. Hansen (1991).

Primary Examiner—Bernard Lipman
Attorney, Agent, or Firm—Paul S. Chirgott

[57] ABSTRACT

An anionic electrocoating composition is provided including an electrodepositable β-hydroxyalkylamide curing agent and an electrodepositable polymer capable of crosslinking with the curing agent. This curing agent includes an organic radical that (a) contains from 8 to 60 carbon atoms; (b) is derived from a substituted or unsubstituted aliphatic, alicyclic or aromatic hydrocarbon radical; and (c) is bonded to n β-hydroxyalkylamide groups, wherein n is an integer from 1 to 4, to form

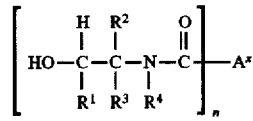

where $R^1$ can be H or a substituted or unsubstituted aliphatic, alicyclic or aromatic group containing up to 6 carbon atoms;

where $R^2$ and $R^3$ can be the same or different and can be H or a substituted or unsubstituted aliphatic, alicyclic, or aromatic group containing up to 36 carbon atoms;

where $R^4$ can be H or a substituted or unsubstituted aliphatic group containing up to 8 carbon atoms when n is an integer form 2 to 4, and a β-hydroxy substituted aliphatic group containing up to 6 carbon atoms when n is 1;

where A is the organic radical;

where x is the valency of the organic radical and an integer greater than or equal to n; and where $R^1$, $R^2$, $R^3$, $R^4$ and A, either individually or combined, have a carbon chain length, or substituted groups, or both, such that the resulting curing agent has a lipophilic nature enabling it to associate with the organic phase of the electrocoating composition and deposits onto a conductive during an anionic electrocoating process.

23 Claims, No Drawings

5,744,531

ANIONIC ELECTROCOATING COMPOSITIONS CONTAINING HYDROXYALKYLAMIDE CURING AGENTS

FIELD OF THE INVENTION

This invention pertains to anionic electrodepositable coating compositions containing hydroxyalkylamide curing agents, methods of making such compositions, methods of applying such compositions onto conductive substrates, the resulting coated articles.

BACKGROUND OF THE INVENTION

Certain aqueous coating compositions can be applied by the process of electrodeposition. To employ this process, a coating composition is placed in contact with an electrically conductive anode and an electrically conductive cathode. Then, sufficient voltage is impressed between the electrodes to deposit an adherent, electrically insulating coating onto one of the electrodes. Electrocoating compositions can be either anionic or cationic. In anionic electrodeposition processes, the coating is deposited onto the anode, and in cationic electrodeposition processes, the coating is deposited onto the cathode.

Electrocoating compositions are two-phase systems that contain micelles of ionic polymers that are stably dispersed in an aqueous medium containing oppositely-charged ionic materials. The charge-bearing properties of the micelles and the aqueous medium act to stabilize the dispersion. In anionic electrocoating compositions, the micelles bear a negative charge, and the aqueous medium contains positively-charged materials.

Many electrocoating compositions also contain nonionic, water-insoluble materials. These materials become associated with the micelles and co-deposit with the ionic polymer onto the substrate. Examples of such materials include low molecular weight nonionic polymeric materials, organic solvents and pigments.

When voltage is impressed between two electrodes that are immersed in an anionic electrocoating composition, an electrolytic process is initiated. During such a process, the positively-charged materials in the aqueous medium begin to migrate toward the cathode, and negatively-charged micelles begin to migrate toward the anode. This results in destabilization of the anionic dispersion in the area near the anode. Accordingly, the negatively-charged micelles flocculate onto the surface of the anode to form an adherent, electrically insulative film. The rate of migration of charged particles towards the electrodes is determined by several factors such as the applied voltage, the charge density on the micelles, the molecular weight of the polymer and the distance of the charged species from the electrodes.

Typically, commercially available anionic electrocoating compositions are thermosetting compositions that employ melamine curing agents to crosslink with hydroxyl-functional polymers. However, melamine curing agents are synthesized from formaldehyde, which is becoming increasingly regulated. Formaldehyde can be found in all anionic electrocoating compositions prepared from melamine curing agents. Since the formaldehyde can volatilize from the anionic electrodeposition bath, or from a deposited a film as it cures, it has become desirable to find alternative crosslinking agents for use with anionic electrocoating compositions.

In cationic electrocoating compositions, isocyanate-hydroxy reactions are commonly used for curing purposes. Such a reaction does not produce the undesirable by-products typically associated with the use of melamine crosslinking agents. Notwithstanding its exploitation in cationic electrocoating compositions, it is difficult to make isocyanate-hydroxy reactions work in anionic electrocoating compositions because the isocyanate curing reaction is inhibited at the pH levels typical of such compositions. Moreover, isocyanate crosslinkers are typically blocked or hindered with high molecular weight alcohols, which are designed to prevent the crosslinking reaction from occurring at ambient temperatures. Upon heat-curing, these alcohols are driven off; thus leading to an undesirable weight loss and/or shrinkage of the film.

Acid-epoxy reactions also do not produce the undesirable by-products typically associated with the use of melamine crosslinking agents. Although these can be used with anionic electrocoating compositions, it is difficult, if even possible, to block or hinder this crosslinking reaction for an extended period of time in a commercially feasible manner. Accordingly, such formulations would be relatively unstable upon storage.

Another class of known curing agents includes β-hydroxyalkylamides. See, for example, U.S. Pat. Nos. 4,076,917; 4,101,606; 4,115,637; 4,138,541; 4,346,144; 4,727,111; 4,801,680; and 4,889,890. This class of curing agents typically does not produce significant quantities of the undesirable by-products typically associated with the use of melamine crosslinking agents. Moreover, this class of curing agents also does not typically require the use of blocking or hindering groups to impart stability of the resulting coating composition at ambient temperatures.

However, commercially available β-hydroxyalkylamide curing agents are not lipophilic enough such that they can be used effectively in anionic electrocoating compositions. In other words, the commercially available β-hydroxyalkylamide curing agents have a greater tendency to dissolve in the aqueous medium of the anionic electrocoating composition rather than associate themselves with the micelles of the disperse phase. As such, they would not co-deposit with the micelles onto the anode. Therefore, these commercially available β-hydroxyalkylamide curing agents would not be present in the deposited film in sufficient quantities to participate in a crosslinking reaction. In addition, β-hydroxyalkylamide curing agents are known to cause an objectionable amount of yellowing when they are present in cured films.

SUMMARY OF THE INVENTION

The present invention is based upon the discovery that a specific class of β-hydroxyalkylamide curing agents can be made to co-deposit onto a conductive substrate with ionic polymer salts in an anionic electrocoating composition. Furthermore, it is also based upon the discovery that specific β-hydroxyalkylamide curing agents can be synthesized to reduce the yellowing effect typically associated with the use of such compositions.

In addition, this invention is based upon the discovery of a specific process for making an anionic electrodeposition bath that includes a specific class of β-hydroxyalkylamide curing agents that are made to co-deposit onto a conductive substrate with ionic polymer salts.

Accordingly, one object of this invention is to provide an anionic electrocoating composition that, while emitting relatively low amounts of formaldehyde, if any, has performance properties similar to those coating compositions that emit relatively large amounts of formaldehyde.

Another object of this invention is to provide a non-yellowing, anionic electrocoating composition based upon a β-hydroxyalkylamide-acid crosslinking reaction.

Yet another object of this invention is to provide a process for making an anionic electrodeposition bath that includes a β-hydroxyalkylamide curing agent designed to co-deposit onto a conductive substrate.

Still another object of this invention is to provide a process for coating a conductive substrate by immersing the same in an anionic electrodeposition bath that includes a β-hydroxyalkylamide curing agent designed to co-deposit onto the conductive substrate along with ionic polymer salts.

A further object of this invention is to provide a coated substrate, wherein at least a portion of the coating was applied thereon by an anionic electrodeposition process employing an anionic electrodepositable coating composition including a β-hydroxyalkylamide curing agent designed to co-deposit with ionic polymer salts.

These and other objects are achieved through the implementation of a particular class of β-hydroxyalkylamide curing agents. This class of curing agents co-deposits, along with ionic polymer salts in an anionic electrocoating composition, onto a conductive substrate during an anionic electrocoating process. The curing agents were also found to have an adequate cure response, and under certain circumstances, not to impart an objectionable yellow tint to the cured film.

In accordance with the present invention, there is provided an anionic electrocoating composition that includes a electrodepositable, β-hydroxyalkylamide curing agent and a water dispersible electrodepositable polymer, or mixture of polymers, capable of crosslinking with such a curing agent. The lipophilic nature of these β-hydroxyalkylamide curing agents needs to be such that a sufficient amount of the β-hydroxyalkylamide curing agent associates itself with the organic phase of the anionic electrocoating composition (e.g., the water dispersible electrodepositable polymer) and co-deposits onto a conductive substrate immersed in the anionic electrocoating composition during an electrocoating process so as to aid in curing the electrodeposited composition.

The β-hydroxyalkylamide curing agents used when practicing this invention include at least one β-hydroxyalkylamide group and a monovalent or polyvalent organic radical. This organic radical is typically derived from a substituted or unsubstituted aliphatic, alicyclic or aromatic hydrocarbon radical.

The structural formula below illustrates a β-hydroxyalkylamide curing agent encompassed by the present invention. In this structural formula, an organic radical, A, is bonded to β-hydroxyalkylamide groups, as follows:

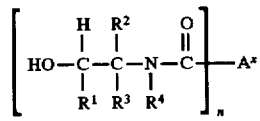

where $R^1$ can be H or a substituted or unsubstituted aliphatic, alicyclic or aromatic group containing up to about 6 carbon atoms;

where $R^2$ and $R^3$ can be the same or different and can be H or a substituted or unsubstituted aliphatic, alicyclic, or aromatic group containing up to about 36 carbon atoms;

where $R^4$ can be H or a substituted or unsubstituted aliphatic group containing up to about 8 carbon atoms; and where x is the valency of the organic radical, A, and is an integer greater than or equal to n.

The variable, n, can be an integer from 1 to 4 provided that, in those instances where n is 1, $R^4$ is a β-hydroxy substituted aliphatic group containing up to about 6 carbon atoms. However, in those instances where n is an integer from 2 to 4, $R^4$ need not be a β-hydroxy substituted aliphatic group. Rather, in this latter instance, $R^4$ can be H or any substituted or unsubstituted aliphatic group containing up to about 8 carbon atoms.

This invention also provides a method of preparing an anionic electrodeposition bath that includes a β-hydroxyalkylamide curing agent having a lipophilic nature such that a sufficient amount of the β-hydroxyalkylamide curing agent associates itself with the organic phase of the anionic electrocoating composition (e.g., the water dispersible, electrodepositable polymer) and co-deposits onto a conductive substrate immersed in the anionic electrocoating composition during an electrocoating process so as to aid in curing the electrodeposited composition.

In the method encompassed by this invention, the β-hydroxyalkylamide curing agent is blended with the other components of the electrocoating composition. In one preferred embodiment, the β-hydroxyalkylamide curing agent is pre-blended with at least one of the organic-based, water dispersible components of the anionic electrodeposition bath to form either an organic-based dispersion or solution. Thereafter, this blend is mixed with the aqueous phase of the anionic electrodeposition bath either by direct or reverse thinning.

Also provided by this invention is a process for coating a conductive substrate by immersing the substrate in an anionic electrodeposition bath that includes a β-hydroxyalkylamide curing agent having a lipophilic nature such that a sufficient amount of the β-hydroxyalkylamide curing agent associates itself with the organic phase of the anionic electrocoating composition and co-deposits onto the conductive substrate during an electrocoating process so as to aid in curing the electrodeposited composition. Still also provided is the coated substrate produced by the process described above.

A more complete appreciation of the present invention, and many of the attendant advantages thereof, will be readily ascertained as the invention becomes better understood by reference to the following detailed description, when considered in connection with the appended claims.

DETAILED DESCRIPTION OF THE INVENTION

The anionic electrocoating compositions of the present invention are dispersions that include an organic phase dispersed in an aqueous medium. In one embodiment of the present invention, the organic phase includes at least one electrodepositable, β-hydroxyalkylamide curing agent and a water dispersible, electrodepositable polymer, or mixture of polymers, capable of crosslinking with such a curing agent. One or more of these electrodepositable polymers carry a negative charge, and thus, form negatively-charged micelles when dispersed in the aqueous medium.

The β-hydroxyalkylamide curing agents of the present invention are made to have a lipophilic nature that enables the curing agents to associate with the negatively charged micelles in the organic phase of the anionic electrocoating composition and, subsequently, co-deposit with the micelles upon application of an electric current. A β-hydroxyalkylamide curing agent that has no lipophilic nature would not associate with the organic phase, and thus would essentially be present only in the aqueous medium. Generally speaking, materials that are not associated with the organic phase of an electrocoating composition are not electrodeposited upon application of an electric current. Only negligible amounts of these materials get caught in the web of a growing film. Thus, hydrophilic β-hydroxyalkylamide curing agents would not be present in the deposited film in concentrations high enough to effect cure.

While the curing agents of the present invention can have some hydrophilic nature, they must be lipophilic enough that a sufficient amount of the curing agent becomes associated with the organic phase of the anionic electrocoating composition, and thus, co-deposits with the organic phase upon application of an electric current. The amount of β-hydroxyalkylamide curing agent that is ultimately deposited depends upon many variables such as the degree to which the curing agent associates with the organic phase of the anionic electrocoating composition and the total amount of curing agent that is present in the anionic electrocoating composition. In practicing the present invention, these two particular parameters are adjusted to ensure that enough curing agent is present in the deposited film to effect the desired level of cure.

The amount of the β-hydroxyalkylamide curing agent required in the deposited film to effect cure depends upon several factors including, without limitation, the average β-hydroxy functionality of the curing agent, the number of reactive sites on the polymer that can crosslink with the curing agent, the resin solids concentration of the electrocoating bath, the curing conditions, the desired properties of the cured coating, and the like.

Without being bound to theory, it is believed that β-hydroxyalkylamide curing agents are reactive at the β-hydroxyl groups. Accordingly, as the β-hydroxy functionality of the curing agent increases, its crosslinking potential also increases; thus, as the level of β-hydroxy functionality increases, less curing agent is required to effect cure under a particular set of curing conditions.

When practicing this invention, the β-hydroxyalkylamide curing agent should have an average β-hydroxy functionality of at least two. Preferably, in order to obtain an optimum curing response under most commercial conditions, the β-hydroxy functionality of such curing agents should range from about two to about eight, and more preferably, from about two to about six.

Typically, if the average β-hydroxy functionality of the curing agent is two, the curing agent should be made lipophilic enough that it deposits to comprise at least about 5 weight percent of the solids in the electrodeposited film. Preferably, under these circumstances, the lipophilic nature of the β-hydroxyalkylamide curing agent should be such that it comprises at least about 10 weight percent of the solids in the electrodeposited film, more preferably at least about 15 weight percent, and even more preferably at least about 20 weight percent. However, as stated above, the weight percentage of the β-hydroxyalkylamide curing agent necessary to effect a desired level of cure under a particular set of circumstances decreases as the average β-hydroxy functionality of the β-hydroxyalkylamide curing agent increases.

The preferred weight percentages of β-hydroxyalkylamide curing agents present in an anionic electrocoating composition for a particular set of circumstances will be readily ascertainable by those of ordinary skill in the art without undue experimentation upon reading this specification.

The electrodepositable, β-hydroxyalkylamide curing agents employed when practicing this invention can be represented by structural formula I, below:

I.

Electrodepositable β-Hydroxyalkylamide Curing Agents

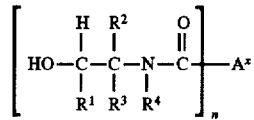

where $R^1$ can be H or a substituted or unsubstituted aliphatic, alicyclic or aromatic group containing up to about 6 carbon atoms;

where $R^2$ and $R^3$ can be the same or different and can be H or a substituted or unsubstituted aliphatic, alicyclic, or aromatic group containing up to about 36 carbon atoms;

where $R^4$ can be H or a substituted or unsubstituted aliphatic group containing up to about 8 carbon atoms; and where x is the valency of the organic radical, A, and is an integer greater than or equal to n.

The variable, n, can be an integer from 1 to 4 and is less than or equal to x. In those instances where n is 1, $R^4$ cannot be an unsubstituted aliphatic group because, under these circumstances, the average hydroxy functionality of the resulting curing agent would be less than two, and the species would not be useful as a crosslinker. Accordingly, in such instances, $R^4$ is a β-hydroxy substituted aliphatic group containing up to about 6 carbon atoms. However, in those instances where n is an integer from 2 to 4, $R^4$ need not be a β-hydroxy substituted aliphatic group. Rather, in this latter instance, $R^4$ can be H or any substituted or unsubstituted aliphatic group containing up to about 8 carbon atoms.

The β-hydroxyalkylamide curing agents of the present invention include a monovalent or polyvalent organic radical that is bonded to one or more amide groups. Preferably, it is either a monovalent or divalent species, with the divalent species being particularly preferred.

The organic radical can be derived from a substituted or unsubstituted aliphatic, alicyclic or aromatic hydrocarbon radical. Preferably, the organic radical is derived from an unsubstituted aliphatic radical.

The organic radical is typically bonded to at least two β-hydroxyalkylamide groups. However, as stated above, the organic radical can be bonded to one β-hydroxyalkylamide group, provided that the β-hydroxyalkylamide group contains two β-hydroxy substituted aliphatic groups. The number of β-hydroxyalkylamide groups actually present can be equal to or less than the number of valent groups present of the organic radical.

Specifically, when the valency, x, of the organic radical, A, is greater than one, as many as (x−1) of its valent groups can be bonded to something other than a β-hydroxyalkylamide group, for example, amide groups that do not contain β-hydroxy functionality, polyamide chains, acid groups or polyacid chains, aromatic groups, ester groups or polyester chains, substituted or unsubstituted olefinic chains, polymeric or oligomeric chains containing acrylic, epoxy, urethane, styrene, silane, siloxane, acrylonitrile, polyalkylene or butadiene functionality, and the like. Preferably, however, when the valency, x, of the organic radical, A, is greater than 1, more than one β-hydroxyalkylamide group is present on the curing agent. In such an instance, R⁴ can be free of β-hydroxyl functionality.

When multiple β-hydroxyalkylamide groups are present on the curing agent, these groups can be chemically identical. However, in most instances, one or more of the β-hydroxyalkylamide groups will be chemically different from the others.

As stated above, the β-hydroxyalkylamide curing agents employed when practicing this invention needs to have a sufficiently strong lipophilic nature. This can be accomplished by selecting $R^1$, $R^2$, $R^3$, $R^4$ and/or the organic radical, A, of structural formula I to have the appropriate carbon chain length and/or substitution groups.

For example, as the carbon chain length of these components increases, the lipophilicity of the resulting β-hydroxyalkylamide curing agent also increases. On the other hand, as the number of ionic substitution groups present on any of these components increases, the curing agent's lipophilicity decreases.

Depending upon the desired features of the electrodepositable, β-hydroxyalkylamide curing agent prepared in accordance with this invention, $R^1$ can be either H or a substituted or unsubstituted aliphatic, alicyclic or aromatic group containing up to about 6 carbon atoms. Preferably, $R^1$ is H or an unsubstituted aliphatic group containing up to about 5 carbon atoms, and more preferably, $R^1$ is H or an alkyl group containing up to about 5 carbon atoms. In one particularly preferred embodiment of the present invention, $R^1$ is H or a methyl group.

$R^2$ and $R^3$ can both be either H or a substituted or unsubstituted aliphatic, alicyclic, or aromatic group containing up to about 36 carbon atoms. Preferably, $R^2$ and $R^3$ are both either H or a branched or straight-chain alkyl group containing up to about 5 carbon atoms. In a particularly preferred embodiment of the present invention, $R^2$ and $R^3$ are both H.

$R^4$ can be either H or a substituted or unsubstituted aliphatic group containing up to about 8 carbon atoms. Preferably, $R^4$ is a β-hydroxy substituted alkyl group containing up to about 6 carbon atoms. In a particularly preferred embodiment of the present invention, $R^4$ is either a β-hydroxyethyl group or a β-hydroxypropyl group.

The organic radical, A, can contain from about 8 to about 60 carbon atoms. Preferably, the organic radical, A, contains from about 9 to about 50 carbon atoms, more preferably, from about 10 to about 45 carbon atoms, and even more preferably, from about 11 to about 40 carbon atoms. For example, in one preferred embodiment, if $R^1$ is H or a methyl group, $R^2$ and $R^3$ are both H, and $R^4$ is either a β-hydroxyethyl group or a β-hydroxypropyl group, the organic radical, A, preferably contains from about 8 to about 50 carbon atoms, more preferably, from about 10 to about 40 carbon atoms, and even more preferably, from about 12 to about 30 carbon atoms.

Accordingly, the carbon chain length of $R^1$, $R^2$, $R^3$, $R^4$ and/or the organic radical, A, and the substitution groups thereon, if any, are chosen such that the resulting β-hydroxyalkylamide curing agent (a) will not substantially dissolve in the aqueous medium of the anionic electrocoating composition bath, and (b) will associate, in some proportion, with the negatively-charged micelles of the organic phase of the anionic electrodeposition bath. Typically, when practicing this invention, the carbon chain length of $R^1$, $R^2$, $R^3$, $R^4$ and/or the organic radical, A, and the substitution groups thereon, if any, are chosen such that at least about 30 weight percent of the resulting β-hydroxyalkylamide curing agent associates with the negatively-charged micelles of the organic phase of the anionic electrodeposition bath. Preferably, the carbon chain length of $R^1$, $R^2$, $R^3$, $R^4$ and/or the organic radical, A, and the substitution groups thereon, if any, are chosen such that at least about 50 weight percent, more preferably at least about 70 weight percent, and even more preferably at least about 90 weight percent, of the resulting β-hydroxyalkylamide curing agent associates with the negatively-charged micelles of the organic phase of the anionic electrodeposition bath. These weight percentages are based upon the total weight of the β-hydroxyalkylamide curing agent added to the electrocoating composition.

Examples of β-hydroxyalkylamide curing agents that can be used when practicing this invention include: N,N-(2-hydroxyethyl)dodecanamide; N,N-(2-hydroxyethyl) cocoamide; N,N-(2-hydroxyethyl)12-hydroxystearamide; N,N-(2-hydroxyethyl)stearamide; bis[N,N-di(2-hydroxyethyl)]2-[CH₃CH(CH)₁₅]succinamide; bis[N,N-di(2-hydroxyethyl)]2-[CH₃(CH₁₆]succinamide; bis[N,N-di(2-hydroxyethyl)]2-[CH₃(CH)₁₃]succinamide; bis[N,N,-di(2-hydroxethyl)]amide of [(CH₂)₁₈(COOH)₂]; bis[N,N,-di(2-hydroxethyl)]eicosanamide; bis[N,N,-di(2-hydroxyethyl) dimeramide; and bis[N,N,-di(2-hydroxyethyl)]amide of dimer acid [(CH)₈(CH₂)₂₄(CH₃)₂(COOH)₂]. The preferred curing agent from the above list will depend upon the desired electrodepositable features of the curing agent, the desired curing procedure and the desired properties of the cured composition.

A mixture of β-hydroxyalkylamide curing agents can be used when practicing this invention. If a mixture of curing agents is used, it is preferred that in one, the organic radical is a divalent, saturated, branched alkyl group, and in the other, the organic radical is a monovalent, saturated, straight-chain alkyl groups. Moreover, in one particularly preferred embodiment of the present invention, the anionic electrocoating composition employs a mixture of β-hydroxyalkylamide curing agents represented by the structural formulae II and III, below:

II.

β-Hydroxyalkylamide Curing Agent

Containing a Branched Organic Radical

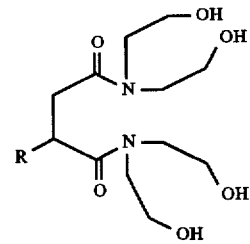

where R is a saturated, straight-chain alkyl group with a carbon chain length of from about 16 to about 18.

III.

β-Hydroxyalkylamide Curing Agent

Containing a Straight-Chain Organic Radical

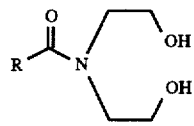

where R is a saturated, straight-chain alkyl group with a carbon chain length of from about 8 to about 18.

Preferably, the β-hydroxyalkylamide curing agents represented by the structural formulae II and III are present in a proportion of from about 0.5:1 to about 8:1, more preferably from about 0.5:1 to about 4:1, and even more preferably from about 0.5:1 to about 1:1. The aforementioned ratios are based upon the relative weight of each curing agent.

The β-hydroxyalkylamide curing agents can be prepared by reacting a lower alkyl ester or mixture of esters of carboxylic acids with a β-hydroxyalkylamine at a temperature ranging from between about ambient temperature to about 200° C., depending upon the choice of reactants and the presence or absence of a catalyst. Suitable catalysts that can be used include basic catalysts (e.g., sodium methoxide, potassium methoxide, sodium butoxide, potassium butoxide, sodium hydroxide and potassium hydroxide); and titanium catalysts (e.g., the simple and chelated esters of orthotitanic acid such as tetrabutyltitanate). If catalysts are used, they are typically present at levels of from about 0.1 to about 1.0 percent by weight, based upon the weight of the alkyl ester.

In addition to the β-hydroxyalkylamide curing agents described above, the anionic electrocoating composition of the present invention further includes a water dispersible, electrodepositable polymer or mixture of polymers capable of crosslinking with the curing agent. Examples of such polymers include those that are classified as solution polymers, dispersion polymers and/or suspension polymers, provided that the polymers can ultimately be dispersed in water, and are capable of crosslinking with the curing agents of the present invention. In other words, the electrodepositable polymers should contain acid functional groups, which impart a degree of hydrophilicity to the polymers.

Preferably, the acid functionality is imparted to the electrodepositable polymers by carboxylic acids. However, suitable electrodepositable polymers can be prepared from alternative materials, such as phosphoric acid or sulfuric acid.

A variety of appropriate carboxylic acid-containing polymers are known. One example of a suitable material is the reaction product or adduct of a drying oil or semi-drying oil fatty acid ester with a dicarboxylic acid or anhydride. Another vehicle comprises a fatty acid ester, unsaturated acid or anhydride reaction products and any additional unsaturated modifying materials that are further reacted with polyol. Still another type of vehicle that gives desirable results are the at least partially neutralized interpolymers of hydroxyalkyl esters of unsaturated carboxylic acid and at least one other ethylenically unsaturated monomer.

A further electrodepositable composition of desirable properties includes mixed ester of a resinous polyol. These compositions are described in detail in U.S. Pat. No. 3,749,657, in particular, column 2, lines 16 to 75, column 9, lines 1 to 75, and column 10, lines 1 to 13, all of which are incorporated herein by reference.

The preferred acid-functional polymers that can be used when practicing this invention include acid-functional acrylic polymers, polystyrene polymers, polyester polymers, epoxy polymers, and the like, and/or any combination thereof. Of these, acid-functional acrylic or epoxy polymers are particularly preferred.

The electrodepositable polymers can contain functional groups other than acid groups. Examples of such other functional groups that can be present when practicing the present invention include hydroxyl groups, amino groups, and the like, and/or any combination thereof. Synthetic methods for preparing these electrodepositable polymers are well known by those skilled in the art.

Another ingredient that can be present in the aqueous medium of the anionic electrodepositable composition is an organic or inorganic water soluble base. Suitable examples include ammonia, methyl ethyl amine or triethyl amine, and the like.

Optional ingredients that can be present in the aqueous medium of the anionic electrodepositable composition include surfactants, water-soluble organic co-solvents, plasticizers, and the like and/or any combination thereof.

The electrodepositable polymers described above typically have a number-average molecular weight of from about 1,000 to about 100,000. Preferably, their number average molecular weight ranges from about 10,000 to about 50,000, and more preferably, from about 15,000 to about 30,000. These number average molecular weights are determined by gel permeation chromatography using polystyrene as a standard.

Once synthesized, various optional ingredients can be blended into the electrodepositable polymers. Examples of such optional ingredients include organic solvents, plasticizers, surfactants, stir-in flattening agents, and the like, and/or combinations thereof. Preferably, one or more of the β-hydroxyalkylamide curing agents of the present invention are blended into the electrodepositable polymers. Thereafter, the polymer/curing agent mixture is dispersed in the aqueous medium of the electrodeposition bath by either direct or reverse thinning under gentle agitation.

The anionic electrocoating composition of the present invention is typically prepared such that its resin solids content is from about 2 percent to about 60 percent. Preferably, the resin solids content ranges from about 10 percent to about 50 percent, and more preferably, from about 15 percent to about 40 percent by weight. These percentages are based upon the total weight of the dispersion, as determined at 110° C. for one hour.

The average particle size of the organic phase of the anionic electrocoating composition of the present invention is generally less than about 10 microns. Preferably, the average particle size is less than about 5 microns, more preferably less than about 1 micron, and even more preferably, less than about 0.5 micron.

Moreover, in the anionic electrocoating compositions of the present invention, the β-hydroxyalkylamide curing agent and the electrodepositable polymers are present at levels chosen such that an applied film of the resulting composition will cure upon application of heat. Typically, the β-hydroxyalkylamide curing agents are present at a level of from about 2 to about 50 percent, preferably, from about 5 to about 40 percent, more preferably, from about 10 to about 30 percent by weight. On the other hand, the electrodepositable polymer or mixture of polymers is typically present at a level of from about 50 to about 98 percent, preferably, from about 60 to about 95 percent, more preferably, from about 70 to about 90 percent by weight. The aforementioned percentages are based upon the total weight of resin solids in the electrocoating composition.

An amount of water, preferably deionized water, is typically added to the electrocoating composition to adjust the total resin solids level. In many instances, the resin solids level of the electrocoating composition ranges from about 2 to about 50 percent. Typically, an amount of water added to the electrocoating composition such that the total resin solids ranges from about 5 to about 40 percent, and more preferably, from about 10 to about 30 percent. The aforementioned percentages are based upon the total weight of the electrocoating composition.

In one particularly preferred embodiment of the present invention, the electrocoating composition further includes zinc oxide, which is present at a level effective to reduce the yellowness of a cured film of the electrocoating composition on a substrate. If used, the zinc oxide is typically present at a level of from about 0.1 to about 5.0 percent, preferably, from about 0.2 to about 3.0 percent, and more preferably, from about 0.3 to about 1.0 percent by weight. The aforementioned percentages are based upon the total weight of resin solids in the electrocoating composition.

If used, the zinc oxide is typically added to an aqueous medium. Thereafter, the mixture of curing agents and electrodepositable polymers is dispersed into the zinc oxide mixture. Typically, such an aqueous medium consists primarily of water, preferably deionized water, but can also contain other optional ingredients as previously described.

Alternatively, the zinc oxide can be dissolved into the mixture of electrodepositable polymers. Thereafter, the entire mixture can be dispersed into an aqueous medium by direct or reverse thinning. Also, the zinc oxide can be added in the form of a pigment paste. Here, an amount of zinc oxide can be dispersed in an amount of polymer using a grinding mill. Methods of preparing pigment pastes are well known by those skilled in the art.

It has also been observed that, when the organic radical of the curing agent, to which the β-hydroxyalkylamide group (s) is attached, is a saturated aliphatic radical, this reduces the yellowness typically associated with cured films prepared from the anionic electrocoating composition.

The electrocoating compositions of the present invention can contain still other optional ingredients. Examples of such include anti-oxidants, UV light absorbers, flow control agents, anti-settling agents, catalysts, anti-foaming additives, pigment wetting additives, surface tension modifiers, waxes, corrosion inhibitors, inorganic or organic acids or bases, and the like, and/or combinations thereof. When employed, these materials are generally present at a levels of up to about 25 percent, preferably, of up to about 15 percent, and more preferably, of up to about 10 percent by weight. The aforementioned percentages are based upon the total weight of resin solids in the electrocoating composition.

Optionally, a coalescing solvent can also be employed. The coalescing solvent serves to modify application properties of the coating. Examples of suitable coalescing solvents include hydrocarbons, alcohols, esters, ethers, ketones and the like. The preferred coalescing solvents include alcohols, polyols and ketones.

Specific coalescing solvents that can be used include isopropanol; butanol; 2-ethylhexanol; isophorone; 4-methoxypentanone; ethylene and propylene glycol; and the monoethyl, monobutyl and monohexyl ethers of ethylene glycol. If used, the amount of coalescing solvent present is generally ranges from about 0.01 and about 25 percent. Preferably, the amount of coalescing solvent present is from about 0.05 to about 15 percent by weight, more preferably, from about 0.05 to about 10 percent, and even more preferably, from about 0.05 to about 5 percent. The aforementioned percentages are based upon the total weight of the electrocoating composition.

Typically, but not necessarily, a pigment composition is also present in the electrocoating composition of the present invention. If used, pigment compositions can be of the conventional types. Examples of such include iron oxides, lead oxides, strontium chromate, carbon black, coal dust, titanium dioxide, talc, barium sulfate, color pigments such as cadmium yellow, cadmium red, chromium yellow and the like, and/or combinations thereof. The pigment content of the electrocoating composition is usually expressed as a pigment-to-binder ratio. If pigments are employed when practicing the present invention, the pigment-to-binder ratio usually ranges from about 0.02:1 to about 1:1.

As previously mentioned, the β-hydroxyalkylamide curing agents employed when practicing this invention need to have a sufficiently strong lipophilic nature. Therefore, once synthesized, the curing agents often can be easily dispersed in an aqueous medium under gentle agitation. However, depending upon the extent of their hydrophilic nature, the curing agents may partition such that a significant portion of the curing agent is present in the aqueous phase, rather than remaining associated with the resinous micelles of the organic phase, if simply dispersed as described above. This is undesirable, because the materials in the aqueous phase usually fail to electrodeposit onto the substrate.

Accordingly, another embodiment of this invention encompasses a method of resolving this problem if it occurs. Specifically, it has been observed that this problem, if present, can be overcome by pre-blending the curing agents prepared in accordance with this invention with at least one of the organic-based, water dispersible components of the anionic electrodeposition bath to form either an organic-based dispersion or solution. Thereafter, this blend is mixed with the aqueous phase of the electrodeposition bath either by direct or reverse thinning.

Using this method maximizes the amount of curing agent that becomes associated with the organic phase of the dispersion, and, as a result, the amount of curing agent that electrodeposits onto the substrate. Moreover, this method of addition also reduces the yellowness of a cured film of the electrocoating composition on a substrate.

This invention further encompasses a method of coating a conductive substrate with the anionic electrocoating composition described above. According to this method, the conductive substrate serves as the anode in an electrical circuit. Both the anode and a cathode are immersed into the electrocoating composition described above. An electric current is then passed between the electrode, so as to cause the anionic electrocoating composition to deposit as a coating on the anode.

The conditions under which electrodeposition is carried out are, in general, similar to those used in electrodeposition of other types of coatings. The applied voltage can be varied greatly and can be, for example, as low as one volt or as high as several thousand volts. Typically, the applied voltage is between about 50 and 500 volts.

Current density is usually between about 0.5 and about 15 amperes per square foot. This value tends to decrease during the electrodeposition process.

After electrodeposition of the coating composition, the coated substrate is generally rinsed with water, preferably deionized water. Examples of optional ingredients that can be present in the rinse water include surfactants, anti-bacterial agents, and the like and/or a combination thereof.

After being rinsed, the coating that remains on the substrate is cured at elevated temperatures by any conventional method. Examples of conventional curing methods include baking the coated substrate in ovens or with banks of infrared heat lamps.

Curing temperatures depend, in part, upon the reactivity of the β-hydroxyalkylamide curing agent and upon the ratio of the number of β-hydroxy groups present on the curing agent to the number of acid groups present on the electrodepositable polymer. Typically, curing is usually accomplished at temperatures from between about 750° C. and about 300° C.

Yet another embodiment of this invention encompasses a coated substrate, wherein at least a portion of the coating applied thereon was done so in an anionic electrodeposition process, and wherein the electrodeposited coating contained β-hydroxyalkylamide curing agent also encompassed by this present invention. Still a further embodiment of this invention encompasses a coated substrate, wherein at least a portion of the coating applied thereon was done so in the anionic electrodeposition process also encompassed by this present invention.

The following examples illustrate various embodiments of the invention. These examples are not, however, to be considered as limiting the scope of the invention to their details. All parts and percentages in the examples are by weight unless otherwise indicated.

EXAMPLES

In all of the following examples, acid values were calculated by multiplying the milliequivalents (also referred to herein as "meq") of acid by 56.1. The milliequivalents of acid were measured by titration with methanolic potassium hydroxide. The milliequivalents of amine were measured by titration with perchloric acid dissolved in acetic acid. The milliequivalents of base were determined by titration with aqueous hydrochloric acid. Water content was determined by a Karl-Fisher titration.

Solids were determined at 110° C. for one hour. Molecular weight was determined by gel permeation chromatography, using polystyrene as a standard. The particle sizes of resin dispersions were determined by light scattering techniques using a Coulter $N_4$ instrument commercially available from Coulter Electronics, Inc. The particle sizes of the pigment pastes were measured with a Hegman Fineness of Grind Gauge, commercially available from Gardner, Inc. An ACCUMET® 15 pH meter, commercially available from Fisher Scientific, was used to measure pH levels. Conductivity was measured with a LECTRO-MHO-METER®, commercially available from Lab Line Instruments.

Dry film thickness was measured with a PERMASCOPE®, commercially available from Fisher Technology, Inc. Gloss was determined with a multi-angle reflectometer, commercially available from BYK Labotron. Solvent resistance was measured by 100 double rubs with acetone. Pencil Hardness was measured according to ASTM D3363. Impact resistance was measured according to ASTM D2794. Mar resistance was measured by scratching the cured film with a fingernail.

Yellowness was measured on a MacBeth ColorEye 3000 colorimeter, equipped with a spherical integrator and an MS2020 sensor. Measurements were made using an incandescent light source, assuming a 10° observer, and including spectral gloss in the color measurement.

Yellowness is expressed as a B-value or as a Yellowness Index. These values were calculated using the CIELAB system of equations. In some instances, yellowness was evaluated by visual observation. Corrosion resistance was evaluated by the salt spray test preferred in accordance with to ASTM B117. Adhesion of the coating, after exposure to salt spray, was measured by the scrape adhesion test described in ASTM D2197. The amount of blistering was evaluated by visual observation.

In Example I, a formaldehyde-free, electrodepositable paint formulation was prepared in accordance with the present invention. In Example II, a conventional melamine-based, formaldehyde-containing, electrodepositable paint formulation, was prepared. Thereafter, Example II compares the performance properties of the formaldehyde-free coating from Example I to those of the formaldehyde-containing coating from Example II. The results of this comparison are shown in Table I.

EXAMPLE I

Preparation of an Electrocoating Composition

Containing β-Hydroxyalkylamide Curing Agents

This example shows the preparation of an anionic electrocoating composition that has two β-hydroxyallcylamide curing agents with fully saturated organic radicals and a carboxylic acid functional electrodepositable polymer. This formulation also contains zinc oxide for reduced yellowness in cured films. This is a formaldehyde-free formulation.

A methyl ester of INDUSTRENE® 223 diacid was prepared from the following ingredients:

| INGREDIENTS | PARTS BY WEIGHT |
|---|---|
| INDUSTRENE ® 223 diacid[1] | 831.2 |
| Methanol | 1600.0 |
| Sulfuric Acid | 8.0 |
| 20% Sodium Hydroxide Solution, (weight/weight) | 60.0 |

[1] A mixture of organic diacids with carbon chain lengths ranging from 8 to 18 (hereinafter referred to as INDUSTRENE 223), commercially available from Witco Corporation.

The first three ingredients were charged into a reaction vessel under a nitrogen sparge and heated to a reflux temperature of 65° C. The reaction mixture was held at 65° C. for two hours until the acid value stalled at 4.41. The methanol was distilled off under a vacuum while refluxing continued at 65° C. for three hours. Next, the reaction mixture was cooled, and the sodium hydroxide solution was added to yield a product with a final acid value of 0.81.

The reaction product prepared above was reacted with diethanolamine to form a β-hydroxyalkylamide curing agent. The following ingredients were used:

| INGREDIENTS | PARTS BY WEIGHT |
|---|---|
| Methyl Ester of INDUSTRENE 223 (as described in this example) | 700.0 |
| Diethanolamine | 331.2 |
| Sodium Methoxide, 25% (weight/weight) | 5.10 |

All of the above ingredients were charged into a reaction vessel under a nitrogen sparge and heated to a reflux temperature of 117° C. Distillation continued for approximately 5 and one-half hours during which time the temperature of the reaction mixture rose to 121° C. The reaction mixture was cooled to yield a product with 0.882 meq of amine.

A second curing agent was prepared wherein a substituted succinic anhydride containing an unsaturated olefinic chain was hydrogenated using the following ingredients:

| INGREDIENTS | PARTS BY WEIGHT |
|---|---|
| Alkenyl Succinic Anhydride[1] | 168.5 |
| Ethyl Acetate | 105.0 |
| 5% Pd on alumina (weight/weight) | 4.5 |

[1] A substituted succinic anhydride containing a straight-chain alkenyl group with a carbon chain length of from about 16 to about 18, with the unsaturated bond present between the α and β carbon atoms, commercially available from Albemarle Corporation.

The alkenyl succinic anhydride and the ethyl acetate were charged into a reaction vessel. Thereafter, the palladium catalyst was charged therein. The reaction vessel was evacuated using nitrogen, and the reaction mixture was pressurized to 51 pounds per square inch (PSI) using hydrogen gas. This pressure was maintained for approximately 8 and one-half hours, during which time the temperature rose from an ambient temperature of 24° C. to 33° C. After reacting for 8 and one-half hours, the pressure was released, and the product was centrifuged to precipitate the palladium catalyst. Then, the product was filtered twice under a vacuum through two #50 filter papers (commercially available from Whatman, Inc.) and packed silica gel to remove the ethyl acetate and any residual catalyst. By this process, 158.5 grams of product was recovered. This product was analyzed by NMR to assure that the carbon=carbon double bonds had been saturated.

The reaction product prepared above was reacted with diethanolamine to form a β-hydroxyalkylamide curing agent. The following ingredients were used:

| INGREDIENTS | PARTS BY WEIGHT |
|---|---|
| Hydrogenated Alkenyl Succinic Anhydride (as described in this example) | 290 |
| Xylene | 145 |
| TYZOR ® TPT Titanate[1] | 3.27 |
| Diethanolamine | 180.38 |

[1] Tetraisopropyl titanate (hereinafter referred to as TYZOR TPT), commercially available from E. I. DuPont de Nemours & Company, Inc.

The hydrogenated alkenyl succinic anhydride and the xylene were charged to a reaction vessel under a nitrogen sparge and mixed for ten minutes at an ambient temperature of 23° C. The TYZOR TPT and the diethanolamine were then added, and the reaction mixture was gently agitated for an additional ten minutes. The reaction mixture was heated and began refluxing at a temperature of 137° C., after about ten minutes. Heating continued for another 1 and one-half hours until a temperature of 146° C. was reached; all the while, the reaction mixture continued refluxing with azeotropic removal of water. After removing 15 grams of water, the reaction mixture was cooled to a temperature of 100° C. over a period of ten minutes. The solvent, xylene, was then distilled off under a reduced pressure of 2 mmHg to yield a product with 1.34 meq of amine.

A carboxylic acid functional acrylic polymer was synthesized; the two β-hydroxyalkylamide curing agents were added thereto; and the resulting mixture was dispersed in an aqueous medium. The following ingredients were used:

| INGREDIENTS | PARTS BY WEIGHT |
|---|---|
| Phenyl CARBITOL ® - Formal[1] | 22.3 |
| POLYMEKON ® Wax[2] | 18.0 |
| Deionized Water | 18.0 |
| Styrene | 128.3 |
| Butyl Acrylate | 175.5 |
| Hydroxyethyl Acrylate | 49.5 |
| Methacrylic Acid | 58.5 |
| Methyl Methacrylate | 38.3 |
| α-Methyl Styrene Dimer | 20.3 |
| LUPERSOL ® 575[3] | 24.5 |
| LUPERSOL 575 | 4.3 |
| Phenyl CARBITOL - Formal | 2.5 |
| Diisopropanolamine | 36.2 |
| β-Hydroxyalkylamide Curing Agent Prepared from INDUSTRENE 223 (as described in this example) | 135.4 |
| β-Hydroxyalkylamide Curing Agent Prepared from Hydrogenated Alkenyl Succinic Anhydride (as described in this example) | 45.1 |
| Deionized Water | 668.2 |
| Zinc Oxide | 7.3 |
| Deionized Water | 1223.4 |

[1] Such an adduct is commercially available from PPG Industries, Inc. Phenyl CARBITOL is the monophenyl ether of diethylene glycol, commercially available from Union Carbide Corporation.
[2] A polyethylene wax, commercially available from Petrolite Specialty Polymers Group.
[3] Tert-amyl peroxy-2-ethyl-hexanoate, commercially available from Elf Atochem North America.

The first portion of Phenyl CARBITOL-Formal, the POLYMEKON wax, and the first portion of deionized water were charged into a reaction vessel under a nitrogen sparge and heated to a reflux temperature of 106° C. The next seven ingredients, up to and including the first portion of LUPERSOL 575, were added over a period of three hours. The reaction mixture was then held at 110° C. for one-half hour. Thereafter, half of the second portion of LUPERSOL 575 and half of the second portion of Phenyl CARBITOL-Formal were added, and the reaction mixture was held at 111° C. for one-half hour. The remaining LUPERSOL 575 and MAZON 305-163 were then added, and the reaction mixture was held at 110° C. for another one-half hour. The reaction mixture was cooled to 91° C. Next, the diisopropanolamine was added, and the reaction mixture was held for another one-half hour. The β-hydroxyalkylamide curing agents were then added over a period of ten minutes. The next portion of deionized water and the zinc oxide were mixed together, and the resin prepared above was reverse-thinned into the zinc oxide mixture over a period of one-half hour. The final portion of deionized water was added with agitation to yield a product with a solids content of 24.2% by weight, 0.242 meq of acid, 0.150 meq of base, an average particle size of 17,030 nm, and a weight-average molecular weight of 15,772.

An acrylic grind vehicle was prepared for use in a zinc-free paste. The grind vehicle's solids content was 80% by weight. The resin solids component was 62 weight percent butyl acrylate, 22 weight percent styrene, and 16 weight percent methacrylic acid; and the solvent component was 57 weight percent butanol and 43 weight percent monobutyl ether of ethylene glycol.

A zinc-free tint paste was then prepared from the following ingredients:

| INGREDIENTS | PARTS BY WEIGHT |
| --- | --- |
| Acrylic Grind Vehicle (as described in this example) | 143.48 |
| Titanium Dioxide | 598.08 |
| ASP ® - 170 Flattener[1] | 67.67 |
| Butyl CELLOSOLVE ®[2] | 163.71 |
| Diisopropanolamine | 27.07 |

[1] A clay flattener, commercially available from Englehard Corporation.
[2] The monobutyl ether of ethylene glycol, commercially available from Union Carbide Corporation.

The materials were mixed with a Cowles blade in a stainless steel container. Ceramic beads were added to the mixture, and agitation continued for about one-hour, until the average particle size was reduced to less than 5 microns. The ceramic beads were then removed by gravity filtration through a sieve.

An anionic electrocoating composition was prepared from the acrylic dispersion and tint paste described above:

| INGREDIENTS | PARTS BY WEIGHT |
| --- | --- |
| Carboxylic Acid Functional Acrylic Polymer Dispersion (as described in this example) | 582.05 |
| Zinc-Free Tint Paste (as described in this example) | 127.11 |
| Deionized Water | 1690.84 |

The materials were added sequentially to a plastic container and mixed under gentle agitation.

The anionic electrocoating composition prepared above had a pH of 8.53 and a conductivity of 633 mMho. The electrocoating composition was heated to 32° C. and electrodeposited by applying 315 volts for two minutes. Three different substrates were tested: cold rolled steel panels pretreated with an iron different substrates were tested: cold rolled steel panels pretreated with an iron phosphate conversion coating and rinsed with deionized water, cold rolled steel panels pretreated with an iron phosphate conversion coating and rinsed with a chrome-based post-rinse composition and deionized water, and cold rolled steel panels pretreated with an iron phosphate conversion coating and a chrome-free organic post-rinse composition. Such panels are commercially available from Advanced Coating Technologies, Inc. as APR 12709, APR 10775, and APR 16793, respectively. One test panel of each was baked for 30 minutes at 163° C.

EXAMPLE II

Preparation of an Electrocoating Composition Containing a Melamine-Formaldehyde Curing Agent This is a comparative example showing the preparation of an anionic electrocoating composition comprising a melamine curing agent. Specifically, an anionic electrocoating composition was prepared from the following ingredients:

| INGREDIENTS | PARTS BY WEIGHT |
| --- | --- |
| Anionic Acrylic Resin[1] | 729.26 |
| Anionic Tint Paste[2] | 241.94 |
| Deionized Water | 1428.80 |

[1] An anionic acrylic resin comprising 15.15% CYMEL ® 1130, and 82.59% of an acrylic prepared from 26.19% styrene, 51.64% butyl acrylate, 10.08% hydroxyethylacrylate, 7.52% methacrylic acid, and 0.48% amino propionic sulfonic acid, supplied in a diluent of n-butanol. Such a resin is commercially available from PPG Industries, Inc. as AR 290. CYMEL 1130 is a methylated/butylated melamine-formaldehyde condensate, commercially available from Cytec Industries.
[2] An anionic tint paste comprising about 49% titanium dioxide, and 9.67% of an acrylic grind vehicle, the percentages being based on the weight of the tint paste. The acrylic grind vehicle is comprised of 33.12% polyethylene glycol, 16.01% styrene, 31.58% butyl acrylate, 6.18% hydroxyethyl acrylate, 7.805 methacrylic acid and 0.04% aminopropionic sulfonic acid. Such a tint paste is commercially available from PPG Industries, Inc. as AP 207.

The materials were added sequentially to a plastic container and mixed under gentle agitation.

The anionic electrocoating composition prepared above was heated to 27° C. and electrodeposited by applying 170 volts for two minutes. Three different substrates were tested: cold rolled steel panels pretreated with an iron phosphate conversion coating and rinsed with deionized water, cold rolled steel panels pretreated with an iron phosphate conversion coating and rinsed with a chrome-based post-rinse composition and deionized water, and cold rolled steel panels pretreated with an iron phosphate conversion coating and a chrome-free organic post-rinse composition. Such panels are commercially available from Advanced Coating Technologies, Inc. as APR 12709, APR 10775, and APR 16793, respectively. One test panel of each substrate was baked for 20 minutes at 163° C. to effect cure.

In the following table, the properties of films produced by the formaldehyde-free electrocoating composition of Example I and the formaldehyde-containing electrocoating composition of Example II are compared. All testing was done over APR 12709 test panels, unless otherwise noted.

TABLE I

A β-Hydroxyalkylamide Curing Agent vs. A Melamine-Formaldehyde Curing Agent

| PROPERTY | ELECTROCOATING COMPOSITION OF EXAMPLE I (INVENTION) | ELECTROCOATING COMPOSITION OF EXAMPLE II (COMPARATIVE) |
| --- | --- | --- |
| Dry Film Thickness (mils) | 1.0 | 1.14 |
| 20° Gloss (%) | 32 | 36 |
| 60° Gloss (%) | 75 | 74 |
| Pencil Hardness | H | H+ |
| Solvent Resistance | Slight Scuff | Very Slight Scuff |
| Total Scribe Creep Based Upon Scrape Adhesion after 24 Hour Exposure to Salt Spray | 8 mm | 10 mm |
| Total Scribe Creep Based Upon Scrape Adhesion after 120 Hour Exposure to Salt Spray[1] | <1 mm | 4 mm |
| Total Scribe Creep Based Upon Scrape Adhesion after 120 Hour Exposure to Salt Spray[2] | 4 mm | 10 mm |

[1] Testing was done over APR 10775 test panels.
[2] Testing was done over APR 16793 test panels.

As can be seen from the above, the β-hydroxyalkylamide curing agent of the present invention performs as good as, and in some instances better than, the melamine-formaldehyde curing agent.

The next example will show that not all β-hydroxyalkylamide curing agents can be used in anionic electrodeposition coating compositions and/or processes.

EXAMPLE III

Preparation of an Electrocoating Composition Containing a Hydrophilic β-Hydroxyalkylamide Curing Agent This example shows the preparation of an electrocoating composition, employing a β-hydroxyalkylamide curing agent that has little, if any, lipophilic tendencies (comparative), and compares its properties to the electrocoating composition of Example I (invention).

In this example, the β-hydroxyalkylamide curing agent that has little, if any, lipophilic tendencies was bis[N,N-di(β-hydroxyethyl)]adipide. This particular β-hydroxyalkylamide curing agent is commercially available from Rohm and Haas Company, Philadelphia, Pa. under the trade name of PRIMED® XL552. The structural formula of this β-hydroxyalkylamide curing agent is as follows:

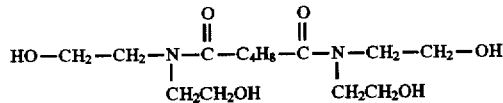

In this example, a carboxylic acid functional acrylic polymer was synthesized and dispersed in an aqueous medium. The following ingredients were used:

| INGREDIENTS | PARTS BY WEIGHT |
| --- | --- |
| n-Butanol | 600.0 |
| POLYMEKON ® Wax | 6.0 |
| Styrene | 654.0 |
| Butyl Acrylate | 900.0 |
| Hydroxyethyl Acrylate | 252.0 |
| Methacrylic Acid | 300.0 |
| t-Dodecyl Mercaptan | 78.0 |
| t-Butyl Perbenzoate | 36.0 |
| Methyl Methacrylate | 192.0 |
| t-Butyl Perbenzoate | 3.0 |
| n-Butanol | 10.0 |
| t-Butyl Perbenzoate | 3.0 |
| n-Butanol | 10.0 |

The first portion of n-butanol and the POLYMEKON wax were charged into a reaction vessel under a nitrogen sparge and heated to a reflux temperature of 113° C. The next seven ingredients, up to and including the methyl methacrylate, were added over a period of three hours. The reaction mixture was then held at 124° C. for one-half hour. Thereafter, half of the second portion of t-butyl perbenzoate and the second portion of n-butanol were added, and the reaction mixture was held at 124° C. for one hour. The remaining t-butyl perbenzoate and n-butanol were then added, and the reaction mixture was held at 124° C. for another hour. The reaction mixture was cooled to yield an acrylic dispersion with a solids content of 79.6% by weight, 1.146 meq of acid, and a weight-average molecular weight of 13,879.

An anionic electrocoating composition was then prepared from the acrylic dispersion. The following ingredients were used:

| INGREDIENTS | PARTS BY WEIGHT |
| --- | --- |
| Carboxylic Acid Functional Acrylic Polymer Solution (as described in this example) | 76.5 |
| n-Butanol | 36.7 |
| Deionized Water | 543.0 |
| Diisopropanolamine | 5.0 |
| PRIMED ® XL552 | 10.5 |
| Diisopropanolamine | 2.0 |
| Deionized Water | 200.0 |

The first portion of diisopropanolamine was heated until it liquefied, then dissolved in the first portion of deionized water with gentle agitation. In a separate container, the n-butanol was added to the carboxylic acid functional acrylic polymer with gentle agitation. Then, the latter solution was added to the former with gentle agitation to produce an anionic dispersion of the carboxylic acid functional acrylic polymer. Next, this dispersion was gravity filtered through a coarse grade paper filter. In a third container, the second portion of diisopropanolamine was heated until it liquefied, then dissolved in the second portion of deionized water. The PRIMED® XL552 was added to this solution with gentle agitation to produce an anionic dispersion of the β-hydroxyalkylamide curing agent. The anionic dispersion containing the curing agent was added to the anionic dispersion containing the carboxylic acid functional acrylic polymer with gentle agitation. No separation or settling of the disperse phase of the anionic electrocoating composition was observed. Finally, the electrocoating composition was heated to 105° F. (40° C.) and stirred for a period of time in order to facilitate evaporation of the n-butanol.

The electrocoating composition prepared above was heated to 30° C. and electrodeposited onto cold rolled steel panels pretreated with an iron phosphate conversion coating and rinsed with deionized water (i.e., APR 12709), by applying 100 volts for two minutes. Unlike the electrocoating composition of Example I, the electrocoating composition prepared in accordance with Example III did not form a cured film. Rather, the film dissolved after only 10 acetone double rubs were performed. As such, none of the properties associated with cured films (e.g., see Table I) were evaluated for the electrocoating composition prepared in accordance with Example III. Without being bound to theory, it is believed that most, if not all of the β-hydroxyalkylamide curing agent leached into the aqueous phase of the anionic electrocoating composition. Accordingly, it was not present on the coated panels in a sufficient concentration so as to cure the electrodeposited film.

In the next set of examples, Example IV shows the preparation of an electrocoating composition containing β-hydroxyalkylamide curing agents with fully saturated organic radicals, and Example V shows the preparation of an electrocoating composition containing β-hydroxyalkylamide curing agents with an unsaturated organic radical. A comparison of Examples IV and V shows that cured films are less yellow when the organic radical is derived from a saturated alkyl radical, rather than from an unsaturated aliphatic radical. The results of this comparison are shown in Table II.

EXAMPLE IV

Preparation of an Electrocoating Composition Containing β-Hydroxyalkylamide Curing Agents With Fully Saturated Organic Radicals This example shows the preparation of an anionic electrocoating composition comprising two β-hydroxyalkylamide curing agents with fully saturated organic radicals and a carboxylic acid functional electrodepositable polymer. This formulation also contains zinc oxide for reduced yellowness in cured films.

As in Example I, the methyl ester of INDUSTRENE 223 was prepared from the following ingredients:

| INGREDIENTS | PARTS BY WEIGHT |
| --- | --- |
| INDUSTRENE 223 | 1039.5 |
| Methanol | 2000 |
| Sulfuric Acid | 10 |
| 20% Sodium Hydroxide Solution (weight/weight) | 70 |

The first three the ingredients were charged into a reaction vessel under a nitrogen sparge and heated to a reflux temperature of 65° C. The reaction mixture was held at 65° C. for two hours until the acid value stalled at 4.51. The methanol was distilled off under a vacuum while refluxing continued at 65° C. for two hours. Next, the reaction mixture was cooled in a cold water bath, and the sodium hydroxide solution was added to precipitate the sulfuric acid as sodium sulfate. Then, the reaction mixture was filtered to yield 957.3 grams of product with a final acid value of 0.48.

The reaction product prepared above was reacted with diethanolamine to form a β-hydroxyalkylamide curing agent. The following ingredients were used:

| INGREDIENTS | PARTS BY WEIGHT |
| --- | --- |
| Methyl Ester of INDUSTRENE 223 (as described in this example) | 600.0 |
| Diethanolamine | 283.9 |
| Sodium Methoxide, 25% (weight/weight) | 4.37 |

All the ingredients were charged into a reaction vessel under a nitrogen sparge and heated to a reflux temperature of 120° C. The reaction mixture was held at 120° C. for one hour, at which point 71.14 grams of methanol had been removed by distillation. Distillation continued for an additional one-half hour under a vacuum to remove 9.94 additional grams of methanol. Next, the reaction mixture was cooled to yield a product with 0.917 meq of amine.

A carboxylic acid functional acrylic polymer was then synthesized; the two β-hydroxyalkylamide curing agents prepared above were added to it; and the mixture was dispersed in an aqueous medium. The following ingredients were used:

| INGREDIENTS | PARTS BY WEIGHT |
| --- | --- |
| Phenyl CARBITOL - Formal | 22.3 |
| Deionized Water | 18.0 |
| Styrene | 128.3 |
| Butyl Acrylate | 175.5 |
| Hydroxyethyl Acrylate | 49.5 |
| Methacrylic Acid | 58.5 |
| Methyl Methacrylate | 38.3 |
| α-Methyl Styrene Dimer | 20.3 |
| LUPERSOL 575 | 24.5 |
| LUPERSOL 575 | 4.3 |
| Phenyl CARBITOL - Formal | 2.5 |

| INGREDIENTS | PARTS BY WEIGHT |
| --- | --- |
| Diisopropanolamine | 36.2 |
| β-Hydroxyalkylamide Curing Agent Prepared from INDUSTRENE 223 (as described in this example) | 87.3 |
| β-Hydroxyalkylamide Curing Agent Prepared from Saturated Alkyl Succinic Anhydride (as described in Example I) | 87.3 |
| Deionized Water | 1834.0 |

The first portion of Phenyl CARBITOL-Formal and the first portion of deionized water were charged into a reaction vessel under a nitrogen sparge and heated to a reflux temperature of 96° C. The next seven ingredients, up to and including the first portion of LUPERSOL 575, were added over a period of three hours. The reaction mixture was then held at 102° C. for one-half hour. Half of the second portion of LUPERSOL 575 and half of the second portion of Phenyl CARBITOL - Formal were added, and the reaction mixture was held at 108° C. for one-half hour. Then, the remaining LUPERSOL 575 and Phenyl CARBITOL-Formal were added, and the reaction mixture was held at 111° C. for another one-half hour. The reaction mixture was cooled to 99° C.; the diisopropanolamine was added; and the reaction mixture was held for another one-half hour. The β-hydroxyalkylamide curing agents were then added over a period of ten minutes. Next, the final portion of deionized water was added with agitation over a period of one hour. The reaction mixture was cooled to yield a product with a solids content of 25.2% by weight, 0.293 meq of acid, 0.186 meq of base, an average particle size of 1150 nm, and a weight-average molecular weight of 17,564.

An acrylic grind vehicle was prepared for use in a zinc-free paste. The grind vehicle's solids content was 70.5% by weight The resin solids component was 54 weight percent butyl acrylate, 27 weight percent styrene, 11 weight percent hydroxyethyl acrylate and 8 weight percent methacrylic acid; and the solvent component was 74 weight percent ethylene glycol monobutyl ether, 19 weight percent diisopropanolamine and 7 weight percent deionized water.

A zinc-free tint paste was prepared from the following ingredients:

| INGREDIENTS | PARTS BY WEIGHT |
| --- | --- |
| Acrylic Grind Vehicle (as described in this example) | 83 |
| Butyl CELLOSOLVE | 1005 |
| Diisopropanolamine | 102.5 |
| Titanium Dioxide | 2850 |
| ASP-170 | 315 |
| Deionized Water | 46 |

The materials were mixed with a Cowles blade in a stainless steel container. Ceramic beads were added to the mixture, and agitation continued for about one hour, until the average particle size was reduced to less then 25 microns. The ceramic beads were then removed by gravity filtration through a sieve.

Next, a tint paste containing zinc oxide was prepared from the following mixture of ingredients:

| INGREDIENTS | PARTS BY WEIGHT |
|---|---|
| Acrylic Grind Vehicle (as described in this example) | 150 |
| Butyl CELLOSOLVE | 197 |
| Diisopropanolamine | 20 |
| Titanium Dioxide | 502 |
| Zinc Oxide | 56 |
| ASP-170 | 62 |
| Deionized water | 9 |

The materials were mixed with a Cowles blade in a stainless steel container. Ceramic beads were added to the mixture, and agitation continued for about one hour, until the average particle size was reduced to less than 25 microns. The ceramic beads were then removed by gravity filtration through a sieve.

An anionic electrocoating composition was prepared from the acrylic dispersion and tint pastes described above:

| INGREDIENTS | PARTS BY WEIGHT |
|---|---|
| Acrylic Dispersion (as described in this example) | 362.64 |
| Zinc-Free Tint Paste (as described in this example) | 62.2 |
| Zinc Oxide Tint Paste (as described in this example) | 17.9 |
| Deionized Water | 556.85 |

The materials were added sequentially to a plastic container and mixed together under gentile agitation.

The anionic electrocoating composition prepared above had a pH of 8.58 and a conductivity of 915 mMho. Three test panels were prepared after the electrocoating composition had aged for four days. The electrocoating composition was heated to 32° C. and electrodeposited by applying 400 volts for two minutes. Cold rolled steel panels pretreated with an iron phosphate conversion coating and rinsed with deionized water served as the anode in the electrodeposition cell. Such panels are commercially available from Advanced Coating Technologies, Inc. as APR 12709. One test panel was baked for 30 minutes at 163° C., another at 177° C., and the third at 191° C. to effect cure.

EXAMPLE V

Preparation of an Electrocoating Composition Containing a β-Hydroxyalkylamide Curing Agent Containing a Fully Saturated Organic Radical and an Unsaturated Organic Radical This example shows the preparation of an anionic electrocoating composition comprising two β-hydroxyalkylamide curing agents, one of which has a fully saturated organic radical, and one of which has an unsaturated organic radical. It also shows the preparation of a carboxylic-acid functional electrodepositable polymer.

This formulation contains zinc oxide for reduced yellowness in cured films. This formulation also contains a relatively small amount of formaldehyde (i.e., less than 1 weight %). It should be noted, however, that the source of the formaldehyde was not the β-hydroxyalkylamide curing agent.

Unsaturated alkenyl succinic anhydride was reacted with diethanolamine to form a β-hydroxyalkylamide curing agent. The following ingredients were used:

| INGREDIENTS | PARTS BY WEIGHT |
|---|---|
| Alkenyl Succinic Anhydride | 252.8 |
| Xylene | 150 |
| TYZOR TPT | 2.85 |
| Diethanolamine | 157.7 |

The alkenyl succinic anhydride and the xylene were charged into a reaction vessel under a nitrogen sparge, and mixed for ten minutes at an ambient temperature of 27° C. The TYZOR TPT and the diethanolamine were added sequentially, and the reaction mixture was mixed for an additional ten minutes. The reaction mixture was heated and began refluxing at a temperature of 141° C., after about 40 minutes. The temperature was increased to 150° C. and heating continued for another hour; all the while, the reaction mixture continued refluxing. The reaction mixture was then cooled to a temperature of 100° C. over a period of 50 minutes. A vacuum was applied and distillation continued for an additional 80 minutes, to remove a total of 138 grams of xylene and 30.5 grams of water.

Next, a carboxylic acid functional acrylic polymer was synthesized; two β-hydroxyalkylamide curing agents were added thereto; and the mixture was dispersed in an aqueous medium. The following ingredients were used:

| INGREDIENTS | PARTS BY WEIGHT |
|---|---|
| Phenyl CARBITOL - Formal | 22.3 |
| Deionized Water | 18.0 |
| Styrene | 128.3 |
| Butyl Acrylate | 175.5 |
| Hydroxyethyl Acrylate | 49.5 |
| Methacrylic Acid | 58.5 |
| Methyl Methacrylate | 38.3 |
| α-Methyl Styrene Dimer | 20.3 |
| LUPERSOL 575 | 24.5 |
| LUPERSOL 575 | 4.3 |
| Phenyl CARBITOL - Formal | 2.5 |
| Diisopropanolamine | 36.2 |
| β-Hydroxyalkylamide Curing Agent Prepared from INDUSTRENE 223 (as described in Example IV) | 87.3 |
| β-Hydroxyalkylamide Curing Agent Prepared from Alkenyl Succinic Anhydride (as described in this example) | 87.3 |
| Deionized Water | 1826.9 |

The first portion of Phenyl CARBITOL-Formal and the first portion of deionized water were charged into a reaction vessel under a nitrogen sparge and heated to a reflux temperature of 97° C. The next seven ingredients, up to and including the first portion of LUPERSOL 575, were added over a period of three hours. The reaction mixture was held at 103° C. for one-half hour. Half of the second portion of LUPERSOL 575 and half of the second portion of Phenyl CARBITOL-Formal were added, and the reaction mixture was held at 107° C. for one-half hour. Then, the remaining LUPERSOL 575 and Phenyl CARBITOL-Formal were added, and the reaction mixture was held at 110° C. for another one-half hour. The reaction mixture was cooled to 99° C.; the diisopropanolamine was added; and the reaction mixture was held for another one-half hour. The β-hydroxyalkylamide curing agents were added over a period of five minutes. The final portion of deionized water was added with agitation over a period of one hour. The reaction mixture was then cooled to yield a product with a solids content of 27.6% by weight, 0.301 meq of acid, 0.177 meq of base, an average particle size of 960 nm, and a weight-average molecular weight of 15,030.

An anionic electrocoating composition was prepared from the acrylic dispersion described above and the following ingredients:

| INGREDIENTS | PARTS BY WEIGHT |
|---|---|
| Acrylic Dispersion (as described in this example) | 331.10 |
| Zinc-Free Tint Paste (as described in Example IV) | 62.2 |
| Zinc Oxide Tint Paste (as described in Example IV) | 17.9 |
| Deionized Water | 588.38 |

The materials were added sequentially to a plastic container and mixed under gentle agitation.

The anionic electrocoating composition prepared above had a pH of 8.44 and a conductivity of 890 mMho. Three test panels were prepared after the electrocoating composition had aged for four days. The electrocoating composition was heated to 32° C. and electrodeposited by applying 350 volts for two minutes. Cold rolled steel panels, pretreated with an iron phosphate conversion coating and rinsed with deionized water, served as the anode in the electrodeposition cell. Such panels are commercially available from Advanced Coating Technologies, Inc. as APR 12709. One test panel was baked for 30 minutes at 163° C., another at 177° C., and the third at 191° C. to effect cure.

In the following table, the properties of films produced by the electrocoating compositions of Examples IV and V are compared.

TABLE II

The Effect of Unsaturation on the Yellowness of Films Produced by Anionic Electrocoating Compositions Containing β-Hydroxyalkylamide Curing Agents

| PROPERTY[1] | ELECTROCOATING COMPOSITION OF EXAMPLE IV[2] | ELECTROCOATING COMPOSITION OF EXAMPLE V[3] |
|---|---|---|
| 60° Gloss (%) | 75 | 73 |
| 20° Gloss (%) | 31 | 29 |
| Solvent Resistance | Very Slight Scuff Marks | Very Slight Scuff Marks |
| Pencil Hardness | H | H |
| Direct Impact Resistance | Passed 160 inch–pounds | Passed 160 inch–pounds |
| Yellowness Index on Underbake (163° C.)[4] | 1.25 | 2.77 |
| Yellowness Index on Standard Bake (177° C.)[4] | 2.59 | 4.82 |
| Yellowness Index on Overbake (191° C.)[4] | 5.63 | 9.58 |

[1]All testing was done on panels baked at 177° C., unless otherwise noted.
[2]Organic radical employed in curing agent is saturated.
[3]Organic radical employed in curing agent is unsaturated.
[4]A measurement of reflectance wherein the lower the number, the whiter the film.

In the next set of examples, Example VI shows the use of a curing agent with one amide group and with two β-hydroxyalkylamide groups, while Example VII shows the use of a curing agent with two amide groups and with four β-hydroxyalkylamide groups. The results of this are shown in Table III.

EXAMPLE VI

Preparation of an Electrocoating Composition Containing a β-Hydroxyalkylamide Curing Agent With Two Amide Groups This example shows the preparation of an anionic electrocoating composition comprising a β-hydroxyalkylamide curing agent with two amide groups. It also shows the preparation of a carboxylic acid functional electrodepositable polymer. This is an unpigmented formulation.

A carboxylic acid functional acrylic polymer was synthesized and dispersed in an aqueous medium. The following ingredients were used:

| INGREDIENTS | PARTS BY WEIGHT |
|---|---|
| n-Butanol | 100 |
| POLYMEKON Wax | 1.0 |
| Styrene | 109.0 |
| Butyl Acrylate | 132.0 |
| Hydroxyethyl Acrylate | 42.0 |
| Methacrylic Acid | 62.5 |
| t-Dodecyl Mercaptan | 15.0 |
| t-Butyl Perbenzoate | 6.2 |
| Methyl Methacrylate | 32.0 |
| t-Butyl Perbenzoate | 1.0 |
| n-Butanol | 60 |
| Diisopropanolamine | 55.0 |
| Deionized Water | 1400.0 |
| FOAMKILL ® 649[1] | 1.5 |

[1]A blend of aliphatic hydrocarbons commercially available from Crucible Chemical Company.

The first portion of n-butanol and the POLYMEKON wax were charged into a reaction vessel under a nitrogen sparge and heated to a reflux temperature of 113° C. The next seven ingredients, up to and including the methyl methacrylate, were added over a period of three hours. The reaction mixture was held at 121° C. for one-half hour. Half of the second portion of t-butyl perbenzoate and half of the second portion of n-butanol were added, and the reaction mixture was held at 119° C. for 45 minutes. Then, the remaining t-butyl perbenzoate and n-butanol were added, and the reaction mixture was held at 121° C. for another 45 minutes. The reaction mixture was cooled to 80° C.; 50 grams of the diisopropanolamine was added; and the reaction mixture was held for 15 minutes, during which time the temperature rose to 91° C. The deionized water, an additional 5 grams of diisopropanolamine, and the FOAMKILL 649 were added to the reaction mixture while it was being cooled to 61° C. The reaction mixture was distilled under a vacuum of 550 mmHg for three hours to remove about 345 grams of aqueous distillate and about 83.2 grams of organic distillate. The reaction mixture was then cooled to yield a product with a solids content of 29.1% by weight, 0.507 meq of acid, 0.273 meq of base, an average particle size of 775 nm, and a weight-average molecular weight of 10,816.

An anionic electrocoating composition was prepared from the acrylic dispersion described above and the following ingredients:

| INGREDIENTS | PARTS BY WEIGHT |
|---|---|
| Acrylic Dispersion (as described above) | 302.9 |
| MAZAMIDE ® 80[1] | 30.6 |
| Deionized Water | 766.4 |

[1]Cocoamide-DEA, commercially available from PPG Industries, Inc.

The materials were added sequentially to a plastic container and mixed under gentle agitation.

The anionic electrocoating composition prepared above had a pH of 7.89 and a conductivity of 1584 mMho. The electrocoating composition was maintained at 24° C. and electrodeposited by applying 200 volts for two minutes. Two substrates were tested: cold rolled steel panels pretreated with an iron phosphate conversion coating and rinsed with deionized water, and hot dip galvanized steel panels pretreated with a zinc phosphate conversion coating and rinsed with a chrome-based post-rinse composition and deionized water. Such panels are commercially available from Advanced Coating Technologies, Inc. as APR 12709 and APR 11806, respectively. The test panels were baked 30 minutes at 177° C. to effect cure.

EXAMPLE VII

Preparation of an Electrocoating Composition Containing a β-Hydroxyalkylamide Curing Agent With Four Amide Groups This example shows the preparation of an anionic electrocoating composition comprising a β-hydroxyalkylamide curing agent with two amide groups. It also shows the preparation of a carboxylic-acid functional electrodepositable polymer. This is an unpigmented formaldehyde-free formulation.

Unsaturated alkenyl succinic anhydride was reacted with diethanolamine to form a β-hydroxyalkylamide curing agent. The following ingredients were used:

| INGREDIENTS | PARTS BY WEIGHT |
|---|---|
| Alkenyl Succinic Anhydride (as described in Example I) | 168.5 |
| Triphenyl Phosphite | 6.4 |
| Xylene | 100 |
| TYZOR-TPT | 1.9 |
| Diethanolamine | 105.1 |

The alkenyl succinic anhydride, triphenyl phosphite and xylene were charged into a reaction vessel under a nitrogen sparge and mixed for one-half hour. The TYZOR-TPT and diethanolamine were added, and mixing continued for ten minutes during which time the temperature rose from an ambient temperature of 24° C. to 63° C. The reaction mixture was heated to a reflux temperature of 143° C. over a period of 15 minutes. An exotherm was observed. The reaction mixture was held at 147° C. for one hour and 45 minutes during which time 9 grams of water had been removed by distillation. The reaction mixture was cooled to 82° C., and distillation was to continue under a vacuum. However, this proved to be unworkable, since the mixture began to foam. Accordingly, the reaction was reheated to 147° C. and was re-distilled for an additional one-half hour under a weak vacuum of 15 mmHg. A total of 100 grams of distillate was removed. About 11 grams of the distillate was an aqueous distillate, and about 89 grams was an organic distillate. Next, the reaction mixture was cooled to yield a product with 1.331 meq of amine, about 71.5% of which was determined to be tertiary amine; about 28% was determined to be secondary amine; and about 0.5% was determined to be primary amine. This determination was made by titrating until three endpoints were observed. The final product contained 0.08% water.

An anionic electrocoating composition was prepared from the acrylic dispersion described above and the following ingredients:

| INGREDIENTS | PARTS BY WEIGHT |
|---|---|
| Acrylic Dispersion (as described in Example VI) | 324.5 |
| β-Hydroxyalkylamide Curing Agent (as described in this example) | 25.0 |
| Deionized Water | 750.5 |

The materials were added sequentially to a plastic container and mixed under gentle agitation.

The anionic electrocoating composition prepared above had a pH of 8.00 and a conductivity of 1170 mMho. The electrocoating composition was maintained at 24° C. and electrodeposited by applying 200 volts for two minutes. Two substrates were tested: cold rolled steel panels pretreated with an iron phosphate conversion coating and rinsed with deionized water, and hot dip galvanized steel panels pretreated with a zinc phosphate conversion coating and rinsed with a chrome-based post-rinse composition and deionized water. Such panels are commercially available from Advanced Coating Technologies, Inc. as APR 12709 and APR 11806, respectively. The test panels were baked 30 minutes at 177° C. to effect cure.

In the following table, the properties of films produced by the electrocoating compositions of Examples V and VI are compared.

TABLE III

The Effect of β-Hydroxyl Content On the Cure Response of Anionic Electrocoating Compositions Containing β-Hydroxyalkylamide Curing Agents

| COATING COMPOSITION | SUBSTRATE | DRY FILM THICKNESS | SOLVENT RESISTANCE | PENCIL HARDNESS | APPEARANCE |
|---|---|---|---|---|---|
| EXAMPLE VI[1] | APR 12709 | 1.15 mils | SCUFF MARKS | HB | YELLOWED |
|  | APR 11806 | 0.66 mils | NO SCUFF MARKS | F | WHITE |
| EXAMPLE VII[2] | ARP 12709 | 0.35 mils | SCUFF MARKS | 3H | YELLOWED |
|  | APR 11806 | 0.17 mils | SCUFF MARKS | 3H | WHITE |

[1]Electrodepositable coating composition employing a curing agent with two amide groups.
[2]Electrodepositable coating composition employing a curing agent with four amide groups.

The next example shows that the curing agents encompassed by the present invention can crosslink with an acid-functional polymer prepared from phosphoric acid instead of from a carboxylic acid.

EXAMPLE VIII

Preparation of an Electrocoating Composition Containing a Phosphatized Epoxy Polymer This example shows the preparation of an anionic electrocoating composition comprising a -hydroxyalkylamide curing agent. It also shows the preparation of a phosphatized epoxy electrodepositable polymer. This is a pigmented, formaldehyde-free formulation.

A material containing a saturated carbon chain 20 units long was reacted with diethanolamine to form a β-hydroxyalkylamide curing agent. The following ingredients were used:

| INGREDIENTS | PARTS BY WEIGHT |
|---|---|
| ALMATEX ® SL-20 Diacid[1] | 174 |
| Diethanolamine | 116 |
| TYZOR-TPT | 1.03 |
| Triphenyl Phosphite | 2.5 |
| Xylene | 99 |
| Xylene | 110 |
| Hexyl CELLOSOLVE[2] | 70 |
| Xylene | 130 |
| Butyl CELLOSOLVE | 50 |

[1] A diacid with a carbon chain length of 20, commercially available from MTC America, Inc.
[2] The monohexyl ether of ethylene glycol, commercially available from Union Carbide Corporation.

The first five ingredients were charged into a reaction vessel under a nitrogen sparge and heated to 115° C. The reaction mixture was refluxing at 115° C. The temperature was lowered to 106° C., and distillation stopped, so the temperature was readjusted to 115° C. Distillation continued for four hours during which time the temperature increased to 120° C. and 77 grams of distillate were collected. Then, the second portion of xylene was added. The reaction mixture was Mated to 125° C. and held for an additional five hours. A total of 191 grams of distillate was removed. Of this amount, about 17 grams of this was aqueous, and about 174 grams was organic. The last three ingredients were added under agitation to thin the viscosity of the resin.

A zinc-free tint paste was prepared from the following ingredients:

| INGREDIENTS | PARTS BY WEIGHT |
|---|---|
| Phosphatized Epoxy Resin[1] | 384 |
| β-Hydroxyalkylamide Curing Agent (as described in this example) | 70 |
| Carbon Black | 773 |
| ASP-170 | 95 |
| Deionized Water | 120 |

[1] An anionic phosphatized epoxy resin prepared from EPON ® 828 and BISPHENOL ® A. EPON 828 is the diglycidyl ether of BISPHENOL A, with a nominal molecular weight of about 376 and an epoxy equivalent weight of about 188, commercially available from Shell Chemical Company. BISPHENOL A is 2,2-bis(4-hydroxyphenol)propane, commercially available from Shell Chemical Company. Such a resin is commercially available PPG Industries, Inc. as AR150.

The materials were mixed with a Cowles blade in a stainless steel container. Ceramic beads were added to the mixture. Agitation continued for about one-half hour until the average particle size was reduced to less than 25 microns. The ceramic beads were then removed by gravity filtration through a sieve.

An anionic electrocoating composition was prepared from the phosphatized epoxy resin, the β-hydroxyalkylamide curing agent and the tint paste described above:

| INGREDIENTS | PARTS BY WEIGHT |
|---|---|
| Phosphatized Epoxy Resin (as described in this example) | 644.5 |
| β-Hydroxyalkylamide Curing Agent (as described in this example) | 97.8 |
| Tint Paste (as described in this example) | 59.6 |
| Deionized Water | 1657.2 |

The materials were added sequentially to a plastic container and mixed under gentle agitation.

The anionic electrocoating composition prepared above was heated to 27° C. and electrodeposited by applying 50 volts for two minutes. Two substrates were tested: cold rolled steel panels pretreated with an iron phosphate conversion coating and rinsed with deionized water, and cold rolled steel panels pretreated with a zinc phosphate conversion coating and rinsed with a chrome-based post-rinse composition and deionized water. Such panels are commercially available from Advanced Coating Technologies, Inc. as APR 12709 and APR 19218, respectively. The test panels were baked 45 minutes at 177° C. to effect cure.

In the following table, the properties of an electrocoating composition containing a phosphatized epoxy polymer is shown.

TABLE IV

Properties of an Electrocoating Composition Containing a Phosphatized Epoxy Polymer

| SUBSTRATE | DRY FILM THICKNESS (mils) | SOLVENT RESISTANCE | PENCIL HARDNESS | 20° GLOSS (%) | 60° GLOSS (%) | SALT SPRAY EXPOSURE[1] |
|---|---|---|---|---|---|---|
| APR 12709 | 1.35 | SLIGHT SCUFFING | H | 81 | 97 | 9 mm total creepage; slight blistering |
| APR 19218 | 1.21 | SLIGHT SCUFFING | F to H | 36 | 79 | 5 mm total creepage; very slight blistering |

[1] Salt spray exposure was for 300 hours. Creepage was measured in accordance to the scrape adhesion test.

It is evident from the foregoing that various modifications, which are apparent to those skilled in the art, can be made to the embodiments of this invention without departing from the spirit or scope thereof. Having thus described the invention, it is claimed as follows.

That which is claimed is:

1. A liquid, anionic electrocoating composition having an organic phase dispersed in an aqueous phase, wherein the organic phase comprises:
   a. at least one electrodepositable β-hydroxyalkylamide curing agent comprising an organic radical, said organic radical:
      i. containing from about 8 to about 60 carbon atoms,
      ii. being derived from a substituted or unsubstituted aliphatic, alicyclic or aromatic hydrocarbon radical, and
      iii. being bonded to n β-hydroxyalkylamide groups, wherein n is an integer from 1 to 4, to form the following structure:

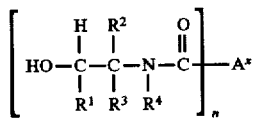

where $R^1$ can be H or a substituted or unsubstituted aliphatic, alicyclic or aromatic group containing up to about 6 carbon atoms;
   where $R^4$ and $R^3$ can be the same or different, and can be H, or a substituted or unsubstituted aliphatic, alicyclic, or aromatic group containing up to about 36 carbon atoms;
   where $R^4$ is H or a substituted or unsubstituted aliphatic group containing up to about 8 carbon atoms when n is an integer form 2 to 4, and is a β-hydroxy substituted aliphatic group containing up to 6 carbon atoms when n is 1;
   where A is an organic radical;
   where x is the valency of the organic radical and an integer greater than or equal to n; and
   where $R^1$, $R^2$, $R^3$, $R^4$ and A, either individually or in any combination, have a carbon chain length, or substituted groups, or both, if any, such that the resulting β-hydroxyalkylamide curing agent has a lipophilic nature such that the β-hydroxyalkylamide curing agent associates with the organic phase of the anionic electrocoating composition and deposits onto a conductive substrate immersed in the anionic electrocoating composition during an anionic electrocoating process, and
   b. at least one water dispersible, electrodepositable polymer capable of crosslinking with said β-hydroxyalkylamide curing agent.

2. The electrocoating composition of claim 1 wherein n is 1 and $R^4$ is a β-hydroxy substituted aliphatic group containing up to about 5 carbon atoms.

3. The electrocoating composition of claim 1 wherein n is an integer from 2 to 4, and $R^4$ is H or a substituted or unsubstituted aliphatic group containing up to about 8 carbon atoms.

4. The electrocoating composition of claim 1 wherein the organic radical contains from between about 9 to about 50 carbon atoms.

5. The electrocoating composition of claim 4, where $R^1$ is H or an alkyl group containing up to about 5 carbon atoms;

where $R^2$ is H or a branched or straight-chain alkyl group containing up to about 5 carbon atoms;

where $R^3$ is H or a branched or straight-chain alkyl group containing up to about 5 carbon atoms; and where $R^4$ is H or a β-hydroxy substituted alkyl group containing up to 6 carbon atoms.

6. The electrocoating composition of claim 5 wherein the organic radical contains from about 10 to about 45 carbon atoms.

7. The electrocoating composition of claim 1 wherein the electrodepositable polymer contains acid-functional groups.

8. The electrocoating composition of claim 7 wherein the acid-functional groups are carboxyl-functional groups.

9. The electrocoating composition of claim 1 wherein the electrodepositable polymer contains an acrylic polymer.

10. The electrocoating composition of claim 1 wherein the electrodepositable polymer has a weight average molecular weight of from about 1,000 to about 100,000.

11. The electrocoating composition of claim 1 wherein
   a. the β-hydroxyalkylamide curing agent is present at a level of from about 2 to 50 percent by weight, and
   b. the electrodepositable polymer is present at a level of from about 50 to 98 percent by weight, said weight percentages being based upon the total weight of resin solids in the electrocoating composition.

12. The electrocoating composition of claim 1 further comprising a pigment.

13. The electrocoating composition of claim 12 wherein the pigment comprises zinc oxide.

14. The electrocoating composition of claim 13 wherein zinc oxide is present at a level effective to reduce yellowness of a cured film of the electrocoating composition.

15. The electrocoating composition of claim 14 wherein zinc oxide is present at a level from about 0.1 to about 5.0 percent, said weight percentages being based upon the total weight of resin solids in the electrocoating composition.

16. The electrocoating composition of claim 1 where a plurality of β-hydroxyalkylamide curing agents are attached to the organic radical.

17. A liquid, anionic electrocoating composition having an organic phase dispersed in an aqueous phase, wherein the organic phase comprises:
   a. a first β-hydroxyalkylamide curing agent is represented by the following structural formula:

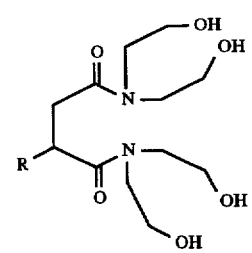

where R is a saturated, straight-chain alkyl group with a carbon chain length of from about 16 to about 18, b. a second β-hydroxyalkylamide curing agent represented by the following structural formula:

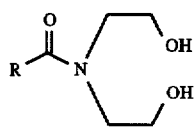

where R is a saturated, straight-chain alkyl group with a carbon chain length of from about 8 to about 18; and c. at least one water dispersible, electrodepositable polymer capable of crosslinking with said first and second β-hydroxyalkylamide curing agents.

18. The electrocoating composition of claim 8 wherein the first and second β-hydroxyalkylamide curing agents are present in a ratio of from about 0.5:1 to about 8:1.

19. The electrocoating composition of claim 17 wherein
 a. a combination of the first and second β-hydroxyalkylamide curing agent is present at a level of from about 2 to 50 percent by weight, and
 b. the electrodepositable polymer is present at a level of from about 50 to 98 percent by weight, said weight percentages being based upon the total weight of resin solids in the electrocoating composition.

20. The electrocoating composition of claim 17 further comprising a pigment.

21. The electrocoating composition of claim 20 wherein the pigment comprises zinc oxide.

22. The electrocoating composition of claim 21 wherein zinc oxide is present at a level effective to reduce yellowness of a cured film of the electrocoating composition.

23. The electrocoating composition of claim 22 wherein zinc oxide is present at a level from about 0.1 to about 5.0 percent, said weight percentages being based upon the total weight of resin solids in the electrocoating composition.

\* \* \* \* \*

UNITED STATES PATENT AND TRADEMARK OFFICE
CERTIFICATE OF CORRECTION

PATENT NO. : 5,744,531
DATED : April 28, 1998
INVENTOR(S) : Kerr et al.

It is certified that error appears in the above-identified patent and that said Letters Patent are hereby corrected as shown below:

Claim 1, Line 30: After "where" delete "$R^4$" and insert --$R^2$--

Signed and Sealed this

Fourth Day of April, 2000

Attest:

Q. TODD DICKINSON

Attesting Officer

Director of Patents and Trademarks